United States Patent
Bao et al.

(10) Patent No.: US 9,380,205 B2
(45) Date of Patent: Jun. 28, 2016

(54) LIQUID CRYSTAL LENS IMAGING APPARATUS AND LIQUID CRYSTAL LENS IMAGING METHOD

(71) Applicant: Shenzhen Mercury Optoelectronics Research Institute, Shenzhen, Guangdong (CN)

(72) Inventors: Rui Bao, Guangdong (CN); Chunhui Cui, Guangdong (CN)

(73) Assignee: SHENZHEN MERCURY OPTOELECTRICS RESEARCH INSTITUTE, Shenzhen, Guangdong (CN)

( * ) Notice: Subject to any disclaimer, the term of this patent is extended or adjusted under 35 U.S.C. 154(b) by 0 days.

(21) Appl. No.: 14/585,608

(22) Filed: Dec. 30, 2014

(65) Prior Publication Data

US 2015/0189174 A1     Jul. 2, 2015

(30) Foreign Application Priority Data

Dec. 30, 2013 (CN) .......................... 2013 1 0747036

(51) Int. Cl.
| | |
|---|---|
| H04N 5/232 | (2006.01) |
| G02F 1/133 | (2006.01) |
| G03B 13/36 | (2006.01) |
| H04N 5/225 | (2006.01) |
| G02F 1/29 | (2006.01) |
| H04N 5/238 | (2006.01) |

(52) U.S. Cl.
CPC ........ *H04N 5/23232* (2013.01); *G02F 1/13306* (2013.01); *G02F 1/29* (2013.01); *G03B 13/36* (2013.01); *H04N 5/2258* (2013.01); *H04N 5/238* (2013.01)

(58) Field of Classification Search
CPC . H04N 5/23232; H04N 5/2258; H04N 5/238; G02B 5/3016; G02F 1/0063
See application file for complete search history.

(56) References Cited

U.S. PATENT DOCUMENTS

| | | | | |
|---|---|---|---|---|
| 2009/0262298 A1* | 10/2009 | Chen | ......................... | G02F 1/13 349/200 |
| 2010/0289941 A1* | 11/2010 | Ito | ......................... | G02B 7/365 348/345 |
| 2011/0025905 A1* | 2/2011 | Tanaka | .................... | H04N 9/045 348/362 |
| 2012/0140044 A1* | 6/2012 | Galstian | ............. | A61B 1/00193 348/47 |
| 2013/0002973 A1* | 1/2013 | Chen | ......................... | G02B 3/14 349/15 |
| 2013/0113889 A1* | 5/2013 | Chen | .................... | H04N 5/2257 348/47 |
| 2014/0028924 A1* | 1/2014 | Yamaguchi | ............... | G02F 1/29 349/1 |
| 2016/0041449 A1* | 2/2016 | Clark | ................ | G02F 1/134309 623/6.56 |

* cited by examiner

*Primary Examiner* — Roberto Velez
*Assistant Examiner* — Abdelaaziz Tissire
(74) *Attorney, Agent, or Firm* — Andrew C. Cheng

(57) ABSTRACT

Liquid crystal lens imaging apparatus and method are provided. The apparatus includes: juxtaposed at least two lens groups, a rubbing direction of alignment layer of a LC lens in one lens group being perpendicular to a rubbing direction of alignment layer of a LC lens in neighboring another lens group; an image capture unit for forming first and second image signals according to light signals passing through the lens groups at a first moment and forming third and fourth image signals according to light signals passing through the lens groups at a second moment; an image processor for processing the image signals to obtain a final formed image signal; and a driving circuit for controlling the LC lenses to be non-lens state and lens state respectively at the first and second moments. No polarizer is used, the intensity of received incident light is increased and the thickness is reduced.

20 Claims, 3 Drawing Sheets

LIQUID CRYSTAL LENS IMAGING APPARATUS AND LIQUID CRYSTAL LENS IMAGING METHOD

TECHNICAL FIELD

The present invention relates to the field of lens imaging, and particularly to a liquid crystal lens imaging apparatus and a liquid crystal lens imaging method.

DESCRIPTION OF RELATED ART

Due to the dependence of liquid crystal on polarized light, the use of liquid crystal lens demands a polarizing device such as a polarizer in front of the liquid crystal lens. The use of polarizing device has a great influence on the optical imaging, primarily in that the intensity of light after passing through the polarizer is reduced to less than a half of the initial value and thus the imaging quality is significantly degraded in low light environment. Therefore, an imaging system is highly desired that directly uses the liquid crystal lens for imaging without using polarizer.

A traditional solution is to stack two liquid crystal lenses with orthogonal rubbing directions of alignment layers together along an optical axis thereof, so that the two liquid crystal lenses can make the natural light converge or diverge. However, in light of current slim and lightweight trends for electronic products, the liquid crystal lens combination with double-layer structure limits its pace of industrialization because of the thickness of liquid crystal lens structure being doubled. Moreover, in the double-layer liquid crystal lens structure, focuses of upper and lower liquid crystal lenses have a position difference on the optical axis, which will directly affect the quality of imaging.

Accordingly, how to realize both the imaging of liquid crystal lens and the reduction of lens structure without the use of polarizer has become a technical problem emergently needed to be solved.

SUMMARY

In order to solve the above problems, the present invention provides a novel liquid crystal lens imaging apparatus in which no polarizer is used and a thickness of the liquid crystal lens imaging apparatus is also reduced.

In particular, a liquid crystal lens imaging apparatus according to an exemplary embodiment of the present invention includes: juxtaposed at least two lens groups, a driving circuit, an image capture unit and an image processor. Each of the lens groups includes at least one liquid crystal lens. A rubbing direction of alignment layer of the liquid crystal lens in one of the lens groups is mutually perpendicular to a rubbing direction of alignment layer of the liquid crystal lens in neighboring another of the lens groups. The driving circuit is connected to the at least two lens groups and configured (i.e., structured and arranged) for controlling the liquid crystal lenses in the at least two lens groups to be at non-lens state at a first moment, and controlling the liquid crystal lenses in the at least two lens groups to be at lens state at a second moment. The image capture unit is configured for capturing light signals passing through two neighboring lens groups at the first moment and forming a first image signal and a second image signal respectively according to the light signals passing through the two neighboring lens groups, and capturing light signals passing through the two neighboring lens groups at the second moment and forming a third image signal and a fourth image signal respectively according to the light signals passing through the two neighboring lens groups at the second moment. The image processor is connected to the image capture unit and configured for receiving the first image signal, the second image signal, the third image signal and the fourth image signal and processing the first through fourth image signals to thereby obtain a processed image signal as a final formed image signal.

In the above exemplary embodiment, in one aspect, the lens groups of the liquid crystal lens imaging apparatus are juxtaposed, and each of the lens groups includes at least one liquid crystal lens or at least one liquid crystal micro-lens array. Compared with the related solution of stacked liquid crystal lenses, the liquid crystal lens imaging apparatus in the present embodiment since only has one layer of liquid crystal lenses, and thus the thickness of the liquid crystal lens imaging apparatus is reduced. In another aspect, in order to obtain high quality image under the circumstance without using polarizer, in the above embodiment, a special control manner is adopted, that is, at a first moment, the liquid crystal lenses are not applied with voltages and at this moment the liquid crystal lenses do not converge or diverge an incident light and thus are like a glass; and at a second moment, the liquid crystal lenses are applied with voltages, the liquid crystal lenses at this moment are capable of converging or diverging the incident light. By processing the images respectively obtained at the two moments to eliminate the influence of that without using polarizer as well as the influence of a perspective difference between two lens groups, the high quality image can be obtained consequently. Accordingly, the liquid crystal lens imaging apparatus according to the present invention not only can obtain high quality image but also can reduce the thickness of the liquid crystal lens imaging apparatus under the circumstance without using polarizer.

In the above technical solution, preferably, the image processor includes a calculating unit. The calculating unit is configured for superimposing the third image signal and processed fourth image signal and removing an image signal formed by the light signal without being modulated by the two neighboring lens groups from superimposed image signal to thereby obtain the final formed image signal. The image signal formed by the light signal without being modulated by the two neighboring lens groups is acknowledged according to the first image signal and/or the second image signal.

In the foregoing, it is explained that when the liquid crystal lenses are not applied with voltages, the liquid crystal lenses do not modulate the incident light; and when the liquid crystal lenses are applied with voltages, the liquid crystal lenses are capable of modulating the incident light. Since the rubbing directions of alignment layers of the liquid crystal lenses in two lens groups are mutually perpendicular to each other, light components of the incident light affected by the two liquid crystal lenses are different. In order to obtain high quality image, it is necessary to eliminate the influence of stray light signal. The stray light signal is the light signal without being modulated by the liquid crystal lenses. At the second moment, the two liquid crystal lenses each only affect light on one polarization direction, and the light signal on other polarization direction is the stray light signal. The stray light signal can be acknowledged according to the light signals obtained at the first moment since the liquid crystal lenses at the first moment do not apply any modulation effect to the incident light, and thus the light signals useful for imaging can be filtered from the light signals obtained at the second moment based on the light signals obtained at the first moment.

In the above any one technical solution, preferably, the calculating unit determines the final formed image signal based on the following formula: III=I'+f(II')−[βI+(1−β)f(II)], wherein, III is the final formed image signal, I' is the third image signal, II' is the fourth image signal, I is the first image signal, II is the second image signal, f(x) is a perspective mapping function for mapping an image formed based on the light signal passing through one lens group into an image formed based on the light signal passing through the other one lens group according to a perspective difference between the two neighboring lens groups, β is a weighting factor, [βI+(1−β)f(II)] represents the image signal formed by the light signal without being modulated by the two lens groups, the weighting factor β is greater than or equal to 0 and smaller than or equal to 1.

In order to remove unwanted image signal from the image signals obtained at the second moment, a corresponding processing algorithm is designed, and the processing algorithm is embedded in the image processor in the form of program. Since the liquid crystal lenses are juxtaposed, the two liquid crystal lenses have a perspective difference existed therebetween. In order to eliminate the influence of the perspective difference, a perspective mapping function is used in the algorithm to map one image into another image and thereby forming a hybrid image signal. As to the hybrid image signal corresponding to the second moment, since it contains unwanted image signal, and thus the unwanted image signal is determined by the two image signals corresponding to the first moment and the weighting factor β.

In the above any one technical solution, preferably, the image processor further includes a weighting factor determining unit. The weighting factor determining unit determines the weighting factor β according to parameters of the lens groups and polarization difference of incident light for the lens groups. The parameters of lens groups include focal length, aperture, and so on. The parameters of lens groups may change during shooting but are easy to be acknowledged. In another aspect, the polarization difference of incident light can be detected in real-time according to the image processing algorithm, and finally the weighting factor can be dynamically determined by combining the parameters of lens groups and the polarization difference.

In the above any one technical solution, preferably, when the incident light entering the lens groups is natural light, the weighting factor β is (½). When the incident light is natural light, light amplitudes of the incident light in all directions are the same.

In the above any one technical solution, preferably, a time interval between the first moment and the second moment is smaller than a preset time. In order to ensure a difference between an incident light at the first moment and an incident light at the second moment to be very small, the time interval between the first moment and the second moment is as short as possible.

In the above any one technical solution, preferably, a distance between optical axes of two neighboring lens groups is smaller than a preset value. The preset value is determined according to a minimum shooting distance of actual requirement. The smaller the minimum shooting distance is, the smaller the preset value can be set. In order to ensure a perspective difference between two lens groups to be as small as possible, since the two lens groups actually are closely arranged, the perspective difference between the two lens groups actually is very small. For shooting a target object far away from the lens groups more, a fixed perspective mapping function can be used to eliminate the imaging difference caused by a tiny perspective difference.

In the above any one technical solution, preferably, the image capture unit includes image sensors having a number matching with the number of the lens groups in one-to-one manner. Each image sensor is used to capture the light signal passing through the corresponding one lens group.

The liquid crystal lens imaging apparatus of the present invention has juxtaposed at least two lens groups. During the image processing, a high contrast image can be obtained after processing image signals captured by the juxtaposed two lens groups. Accordingly, in a preferred embodiment, one lens group corresponds to one image sensor, and thus two lens groups need two image sensors.

In the above any one technical solution, preferably, the image capture unit includes one image sensor. The image sensor is divided into multiple photosensitive areas, the number of the photosensitive areas is matched with the number of the lens groups in one-to-one manner. Each of the photosensitive areas is used to capture the light signal of a corresponding one of the lens groups. Since the cost of two sensors may be higher than that of one sensor, in order to reduce the device cost, a large-sized sensor can be used and each photosensitive area of the sensor is for capturing the light signal of a corresponding one lens group.

In the above any one technical solution, preferably, the image processor further is connected to the driving circuit and for issuing a control signal to the driving circuit according to an image characteristic of the final formed image signal. The driving circuit adjusts voltages inputted to the liquid crystal lenses in the lens groups according to the control signal.

In order to further obtain high contrast image, the image processor further can analyze the final formed image signal and then controls to adjust the voltages inputted to the liquid crystal lenses in the lens groups according to the analysis result, and thereby a better image can be obtained.

According to another aspect of the present invention, a liquid crystal lens imaging method also is provided. The liquid crystal lens imaging method includes: juxtaposing at least two lens groups, each of the lens groups including at least one liquid crystal lens, and a rubbing direction of alignment layer of the liquid crystal lens in one of the lens groups being perpendicular to a rubbing direction of alignment layer of the liquid crystal lens in neighboring another of the lens groups; at a first moment, controlling the liquid crystal lenses in the at least two lens groups to be at non-lens state, capturing light signals passing through two neighboring of the lens groups at the first moment and forming a first image signal and a second image signal respectively according to the light signals passing through the two neighboring lens groups; at a second moment, controlling the liquid crystal lenses in the two neighboring lens groups to be at lens state, capturing light signals passing through the two neighboring lens groups at the second moment and forming a third image signal and a fourth image signal respectively according to the light signals passing through the two neighboring lens groups; and processing the first image signal, the second image signal, the third image signal and the fourth image signal to thereby obtain a processed image signal as a final formed image signal.

The liquid crystal lens imaging method according to the present invention not only can obtain high quality image but also can reduce the thickness of the liquid crystal lens imaging apparatus under the circumstance without using polarizer.

In the above technical solution, preferably, the step of processing the first image signal, the second image signal, the third image signal and the fourth image signal includes: superimposing the third image signal with the processed fourth image signal and removing an image signal formed by the light signal without being modulated by the two lens groups from superimposed image signal to thereby obtain the final formed image signal. The image signal formed by the light signal without being modulated by the two lens groups is acknowledged according to the first image signal and/or the second image signal.

In the foregoing, it is explained that when the liquid crystal lenses are not applied with voltages, the liquid crystal lenses do not modulate the incident light; and when the liquid crystal lenses are applied with voltages, the liquid crystal lenses are capable of modulating the incident light. Since the rubbing directions of alignment layers of the liquid crystal lenses in the two lens groups are mutually perpendicular to each other, light components of the incident light affected by the two liquid crystal lenses are different. In order to obtain high quality image, it is necessary to eliminate the influence of stray light signal, the stray light signal herein is the light signal without being modulated by the liquid crystal lenses. At the second moment, the two liquid crystal lenses each only affect light on one polarization direction and the light signal on other polarization direction is the stray light signal. The stray light signal can be acknowledged according to the light signals obtained at the first moment since the liquid crystal lenses at the first moment do not modulate the incident light, and thus the light signal useful for imaging can be filtered from the light signals obtained at the second moment based on the light signals obtained at the first moment.

In the above any one technical solution, preferably, the final formed image signal is determined based on the following formula: $III=I'+f(II')-[\beta I+(1-\beta)f(II)]$, wherein III is the final formed image signal, I' is the third image signal, II' is the fourth image signal, I is the first image signal, II is the second image signal, f(x) is a perspective mapping function for mapping an image formed based on the light signal passing through one lens group into an image formed based on the light signal passing through the other one lens group according to a perspective difference between the two neighboring lens groups, $\beta$ is a weighting factor, $[\beta I+(1-\beta)f(II)]$ represents the image signal formed by the light signal without being modulated by the two lens groups.

In order to remove unwanted image signal from the image signals obtained at the second moment, a corresponding processing algorithm is designed, and the processing algorithm is embedded in the image processor in the form of program. Since the liquid crystal lenses are juxtaposed, the two liquid crystal lenses have a perspective difference existed therebetween. In order to eliminate the influence of the perspective difference, a perspective mapping function is used in the algorithm to map one image into another image and thereby forming a hybrid image signal. As to the hybrid image signal corresponding to the second moment, since it contains unwanted image signal, and the unwanted image signal is determined by the two image signals corresponding to the first moment and the weighting factor $\beta$. When the weighting factor is 0, only the second image signal is used to remove the unwanted image signal; and when the weighting factor is 1, only the first image signal is used to remove the unwanted image signal.

In the above any one technical solution, preferably, a time interval between the first moment and the second moment is controlled to be smaller than a preset time. In order to ensure a difference between the incident light at the first moment and the incident light at the second moment to be very small, the time interval between the first moment and the second moment is as short as possible.

In the above any one technical solution, preferably, a distance between optical axes of two neighboring lens groups is controlled to be smaller than a preset value. The preset value is determined according to a minimum shooting distance of actual requirement. The smaller the minimum shooting distance is, the smaller the desired preset value can be set. In order to ensure the perspective difference between two lens groups to be as small as possible, the two lens groups actually are closely arranged, and thus the perspective difference between the two lens groups actually is very small. For shooting a target object far away from the lens groups more, a fixed perspective mapping function can be used to eliminate the imaging difference caused by the tiny perspective difference.

In the above any one technical solution, preferably, voltages inputted to the liquid crystal lenses in the lens groups are adjusted according to an image characteristic of the final formed image signal.

In order to further obtain high contrast image, by analyzing the final formed image signal and then controlling to adjust the voltages inputted to the liquid crystal lenses in the lens groups according to the analysis result, a better image can be obtained consequently.

DETAILED DESCRIPTION OF EMBODIMENTS

The present invention will now be described more specifically with reference to the following embodiments. It is understood that, in the case of no conflict, embodiments and features in embodiments of the present application can be mutually combined.

Moreover, it is noted that the following descriptions of embodiments are presented herein for purpose of illustration and description only. It is not intended to be exhaustive or to be limited to the precise form disclosed.

For the convenience of description, in the following, juxtaposed two lens groups and each lens group only having one liquid crystal lens are taken as an example for illustration, but it is understood that, the liquid crystal lens imaging apparatus according to the present invention can include more than two lens groups, e.g., four groups or six groups and the lens groups are juxtaposed with one another, each lens group may include one or multiple liquid crystal lenses, and the liquid crystal lenses in each lens group are arranged in an array.

Figure 1:
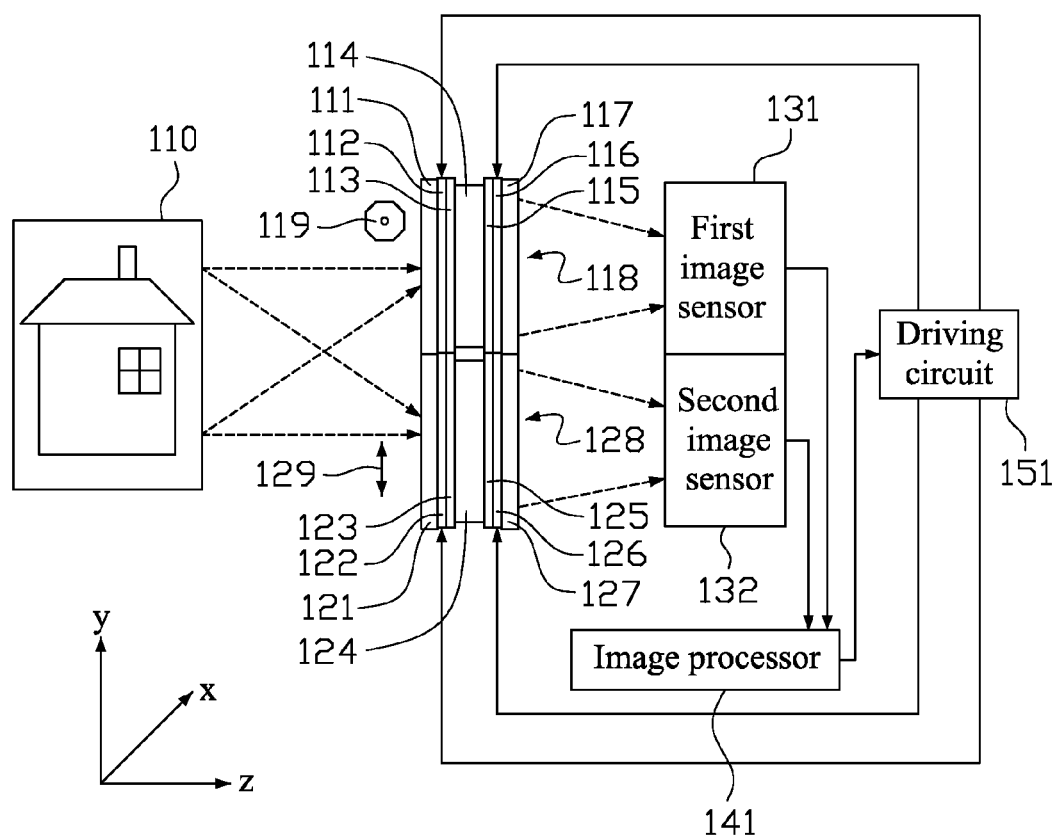
FIG. 1 is a schematic view of a liquid crystal lens imaging apparatus according to an exemplary embodiment of the present invention.

FIG. 1 is a schematic view of a liquid crystal lens imaging apparatus according to an exemplary embodiment of the present invention.

As shown in FIG. 1, the liquid crystal lens imaging apparatus without using polarizer includes a first liquid crystal lens 118 (belonging to a first lens group) and a second liquid crystal lens 128 (belonging to a second lens group) juxtaposed with each other (herein, other related optical devices in the lens groups are not listed out, this is because the other related optical devices included in the imaging apparatus are well-known, such as physical lens groups matched with the use of the liquid crystal lens), and a first image sensor 131 and a second image sensor 132 arranged behind the liquid crystal lenses 118, 128. Image information captured by the first image sensor 131 and the second image sensor 132 are computed and processed by an image processor 141. The image processor 141 can issue a command to a driving circuit 151 according to the image computation result, the driving circuit 151 then applies adjustable voltages to the first liquid crystal lens 118 and the second liquid crystal lens 128, and thereby achieving an automatic control of liquid crystal lens based on the image processing result.

An object 110 is located in front of the first liquid crystal lens 118 and the second liquid crystal lens 128. Light rays passing through the first liquid crystal lens 118 and the second liquid crystal lens 128 are converged or diverged and thereby imaged on the first image sensor 131 and the second image sensor 132. The symbol 119 represents that a rubbing direction of alignment layer of the first liquid crystal lens 118 is the x-direction. The symbol 129 represents that a rubbing direction of alignment layer of the second liquid crystal lens 128 is the y-direction.

After describing the main parts of the liquid crystal lens imaging apparatus according to the present invention, structures of the first liquid crystal lens 118 and the second liquid crystal lens 128 in the liquid crystal lens imaging apparatus will be described below in detail.

The first liquid crystal lens 118 includes a lower transparent substrate 117, an upper transparent substrate 111, a lower transparent electrode 116, an upper transparent electrode 112, a lower alignment layer 115, an upper alignment layer 113 and a liquid crystal layer 114. Rubbing directions of the upper alignment layer 113 and the lower alignment layer 115 are anti-parallel.

The lower transparent substrate 117 of the first liquid crystal lens has a flat plate shape and a material thereof may be transparent glass, quartz, or synthetic resin. The upper transparent 111 also has a flat plate shape and a material thereof also may be transparent glass, quartz or synthetic resin. The upper transparent substrate 111 is disposed facing toward the lower transparent substrate 117.

The second liquid crystal lens 128 has a structure same as that of the first liquid crystal lens 118. The second liquid crystal lens 128 includes a lower transparent substrate 127, an upper transparent substrate 121, a lower transparent electrode 126, an upper transparent electrode 122, a lower alignment layer 125, an upper alignment layer 123 and a liquid crystal layer 124. Rubbing directions of the upper alignment layer 123 and the lower alignment layer 125 are anti-parallel.

The lower transparent substrate 127 of the second liquid crystal lens 128 has a flat plate shape and a material thereof may be transparent glass, quartz or synthetic resin. The upper transparent substrate 121 also has a flat plate shape and a material thereof also may be transparent glass, quartz or synthetic resin. The upper transparent substrate 121 is disposed facing toward the lower transparent substrate 127.

It is noted that, the lower transparent electrode 116 of the first liquid crystal lens 118 is formed on the lower transparent substrate 117 facing toward the upper transparent substrate 111. The upper transparent electrode 112 is formed on the upper transparent substrate 111 facing toward the lower transparent substrate 117.

The lower transparent electrode 126 of the second liquid crystal lens 128 is formed on the lower transparent substrate 127 facing toward the upper transparent substrate 121. The upper transparent electrode 122 is formed on the upper transparent substrate 121 facing toward the lower transparent substrate 127.

The upper transparent electrode 112 and lower transparent electrode 116 of the first liquid crystal lens 118 and the upper transparent electrode 122 and lower transparent electrode 126 of the second liquid crystal lens 128 are made of a transparent electrically conductive material. The transparent electrically conductive material for example is indium tin oxide (ITO), indium zinc oxide (IZO) or amorphous indium tin oxide (α-ITO), but not limited to these.

The liquid crystal layer 114 of the first liquid crystal lens 118 is sandwiched between the upper transparent substrate 111 and the lower transparent substrate 117. The liquid crystal layer 114 has anisotropic refractiveindices.

The liquid crystal layer 124 of the second liquid crystal lens 128 is sandwiched between the upper transparent substrate 121 and the lower transparent substrate 127. The liquid crystal layer 124 has anisotropic refractive-indices.

The upper alignment layer 113 of the first liquid crystal lens 118 is formed on the upper transparent substrate 111 and thereby covers the upper transparent electrode 112. The lower alignment layer 115 is formed on the lower transparent substrate 117 and thereby covers the lower transparent electrode 116.

The upper alignment layer 123 of the second liquid crystal lens 128 is formed on the upper transparent substrate 121 to thereby cover the upper transparent electrode 122. The lower alignment layer 125 is formed on the lower transparent substrate 127 to thereby cover the lower transparent electrode 126.

It is indicated that, the rubbing direction of the alignment layer 113 of the first liquid crystal lens 118 is mutually perpendicular with the rubbing direction of the alignment layer 123 of the second liquid crystal lens 128.

In FIG. 1, the first image sensor 132 is placed directly behind the first liquid crystal lens 118, and the first image sensor 132 only receives light rays passing through the first liquid crystal lens 118. The second image sensor 132 is placed directly behind the second liquid crystal lens 128, and the second image sensor 132 only receives light rays passing through the second liquid crystal lens 128. An arrangement manner between the first image sensor 131 and the second image sensor 132 is the same as the arrangement manner between the first liquid crystal lens 118 and the second liquid crystal lens 128.

The structure of the liquid crystal lens imaging apparatus according to the present invention has been described as the foregoing, and a principle of operation of the liquid crystal lens imaging apparatus according to the present invention will be described below in detail based on the structure of the liquid crystal lens imaging apparatus as shown in FIG. 1.

As shown in FIG. 1, in a first moment, the image processor 141 controls the driving circuit 151 not to apply a voltage on the transparent electrodes 116, 112 of the first liquid crystal lens 118 and the transparent electrodes 126, 122 of the second liquid crystal lens 128, or controls the driving circuit 151 to apply driving voltages to make focal lengths of the liquid crystal lenses 118, 128 be infinite, and thus the first liquid crystal lens 118 and the second liquid crystal lens 128 are at non-lens states. Since the liquid crystal lenses are not applied with driving voltages, the first liquid crystal lens 118 and the second liquid crystal lens 128 at this time directly transmit the incident light are at non-lens states, and would not modulate the incident light and thus are like a glass. At this time, image signals formed by the first image sensor 131 and second image sensor 132 capturing light signals passing through the two liquid crystal lenses 118, 128 can be respectively represented as:

$$I = I_x + I_y \tag{1}$$

$$II = II_x + II_y \tag{2}$$

In the above formulas (1) and (2), x and y represent two mutually perpendicular polarization directions of light wave, and each light signal can be decomposed into two components on the two directions. Correspondingly, each formed image signal can be represented as a superposition of components on two polarization directions.

It is noted that, since the first liquid crystal lens 118 and the second liquid crystal lens 128 as shown in FIG. 1 both are not introduced with polarizing device, the x component and y component of incident light are retained and will pass through the liquid crystal lenses 118, 128.

At a second moment, the image processor 141 controls the driving circuit 151 to apply the transparent electrodes 116, 112 of the first liquid crystal lens 118 and the transparent electrodes 126, 122 of the second liquid crystal lens 128 with voltages, so that polarized lights modulated by the liquid crystal lenses form images on the image sensors and at this time the liquid crystal lenses 118, 128 are at lens states. Each of the liquid crystal lenses 118, 128 will converge or diverge the incident light on a certain polarization direction and directly transmit the incident light on another perpendicular polarization direction. Furthermore, since rubbing directions of alignment layers of the first liquid crystal lens 118 and second liquid crystal lens 128 are mutually perpendicular with each other. Herein, it is assumed without loss of generality that the first liquid crystal lens 118 converges or diverges the x-direction polarized light and directly transmits the y-direction polarized light; the second liquid crystal lens 128 converge or diverge the y-direction polarized light and directly transmits the x-direction polarized light.

In addition, under the circumstance of response speeds of the first liquid crystal lens 118 and second liquid crystal lens 128 to the driving circuit 151 being fast enough, it may be reasonably assumed that incident lights respectively at the first moment and second moment do not occur change (or occurs tiny change but can be ignored). That is, at the first moment and second moment, the y-direction polarized light passing through the first liquid crystal lens 118 and the x-direction polarized light passing through the second crystal lens 128 both are not changed. Therefore, at the second moment, image signals formed according to incident light passing through the first liquid crystal lens 118 and the second liquid crystal lens 128 can be represented as:

$$I' = I'_x + I'_y \quad (3)$$

$$II' = II'_x + II'_y \quad (4)$$

The first image sensor 131 and the second image sensor 132 transfer the image signals obtained in the two moments to the image processor 141.

A time interval between the first moment and the second moment should be as small as possible, e.g., is smaller than a preset time. In the preset time, a shooting scene is without significant change (e.g., change factors such as change of light intensity, change of object displacement in the scene and moving of imaging apparatus). In order to ensure a difference between the incident light at the first moment and the incident light at the second moment to be very small, the time interval between the first moment and the second moment is as short as possible. Under the circumstance of the response speeds of the liquid crystal lenses 118, 128 to voltages being fast enough, it is possible to make the time interval between the first moment and the second moment short enough.

The image processor 141 applies the image signals I, II formed at the first moment and the image signals I', II' formed at the second moment with the following image processing:

$$III = I' + f(II') - [\beta I + (1-\beta)f(II)] \quad (5)$$

In the above formula (5), f(x) is a perspective mapping function for mapping an imaging of perspective of the second liquid crystal lens 128 into an imaging of perspective of the first liquid crystal lens 118, and thus can eliminate the influence of perspective difference between the first liquid crystal lens 118 and the second liquid crystal lens 128. $\beta \in [0, 1]$ is a variable weighting factor. The weighting factor $\beta$ is greater than or equal to 0 and smaller than or equal to 1 and determined according to parameters and polarization difference of incident light of the two lens groups. When the weighting factor is equal to 0, only the second image signal is used to remove unwanted image signal; and when the weighting factor is equal to 1, only the first image signal is used to remove the unwanted image signal. The parameters of lens groups may be changed during shooting but are easy to be acknowledged. In another aspect, it is possible to detect the polarization difference of incident light in real-time according to the image processing algorithm, and finally the weighting factor can be dynamically determined by combining the parameters and the polarization difference of lens groups.

Although the liquid crystal lenses are applied with voltages at the second moment, the liquid crystal lenses each only modulate the light signal on one direction, for example, the first liquid crystal lens 118 only affects the light signal on the x-direction, the second crystal lens 128 only affects the light signal on the y-direction. Accordingly, the image signals formed according to the light signals at the second moment contain unwanted image signal, in order to obtain high contrast image (i.e., the image $(I'_x + II'_y)$ formed entirely by converged or diverged light signals), the image signal $(I_y + II_x)$ formed based on unwanted light signal is needed to be eliminated. Since the $(I_y + II_x)$ is not directly calculated out, a calculation method of determining the unwanted image signal is proposed by the present embodiment is that: $\beta I + (1-\beta)f(II)$.

By further analyzing the formula (5), it can be obtained that:

$$III = I'_x + I'_y + f(II'_x) + f(II'_y) - \beta I_x - \beta I_y - (1-\beta)f(II_x) - \quad (6)$$
$$(1-\beta)f(II_y)$$
$$= I'_x + f(II'_y) + (1-\beta)[I_y - f(II_y)] + \beta[f(II_x) - I_x]$$
$$= I'_x + f(II'_y) + \Delta$$

In the above formula (6), $\Delta$ is an incremental signal and represented as:

$$\Delta = (1-\beta)[I_y - f(II_y)] + \beta[f(II_x) - I_x] \quad (7)$$

In addition, the first liquid crystal lens 118 and the second liquid crystal lens 128 are closely juxtaposed, and preferably a distance between optical axes of the first liquid crystal lens 118 and the second liquid crystal lens 128 is controlled to be smaller than a preset value. The preset value can be determined by a minimum shooting distance of actual requirement. The smaller the minimum shooting distance is, the smaller the desired preset value can be set. For shooting a target object far away from the lens groups more, a fixed perspective mapping function can be used to eliminate imaging difference caused by tiny perspective difference. As shown in FIG. 1, since the first liquid crystal lens 118 and the second liquid crystal lens 128 are closely juxtaposed together, the perspective difference between the two liquid crystal lenses actually is small, differences of received light signals and correspondingly formed images also are small. By the further adjustment of perspective mapping function f(x), the differences of images $I_y$ and $f(II_y)$, $I_x$ and $f(II_x)$ are close to zero, it can be obtained that:

$$\left.\begin{array}{c} I_y - f(II_y) \to 0 \\ I_x - f(II_x) \to 0 \\ 0 < \beta < 1 \end{array}\right\} \Rightarrow \Delta \to 0 \quad (8)$$

Accordingly, by the image processing of the formula (6), the signals $I'_x + f(II'_y)$ can be effectively restored, which is substantially equivalent to an entire image signal formed by polarized lights of x-direction and y-direction simultaneously converged or diverged by the first liquid crystal lens and the second liquid crystal lens at a same perspective.

Moreover, it is assumed the incremental signal $\Delta$ is equal to zero, it can be obtained according to the formula (7) that:

$$\Delta = 0 \Rightarrow \beta = \frac{I_y - f(II_y)}{I_y - f(II_y) + I_x - f(II_x)} \quad (9)$$

When the incident light is natural light, i.e., the incident light wave has the isotropic nature, it can be obtained that:

$$\left.\begin{array}{c} I_y = I_x \\ II_x = II_x \end{array}\right\} \Rightarrow \beta = \frac{1}{2} \quad (10)$$

In the above described embodiment, in one aspect, the lens groups in the liquid crystal lens imaging apparatus are juxtaposed, even if each lens group includes multiple liquid crystal lenses, the multiple liquid crystal lenses are arranged in an array. Compared with the related solution of stacked liquid crystal lenses, the liquid crystal lens imaging apparatus in the present embodiment since only has one layer of liquid crystal lenses, and thus the thickness of the liquid crystal lens imaging apparatus is decreased. In another aspect, in order to obtain high quality image under the circumstance without using polarizer, in the above embodiment, a special control manner is adopted, i.e. at the first moment, the liquid crystal lenses are controlled to be at non-lens state so that the liquid crystal lenses at this moment do not converge or diverge the incident light and are like a glass; and at the second moment, the liquid crystal lenses are controlled to be at lens state so that the liquid crystal lenses at this moment are capable of converging or diverging the incident light. The images obtained at the two moments are processed to eliminate the influence of that without using polarizer as well as the influence of perspective difference between two lens groups, and thereby high quality image can be obtained. Accordingly, the liquid crystal lens imaging apparatus according to the present invention under the circumstance without using polarizer not only can obtain high quality imaging but also can reduce the thickness of the liquid crystal lens imaging apparatus.

Furthermore, in order to obtain high quality imaging on the image sensor, in the liquid crystal lens imaging apparatus of the present invention, several physical lenses can be employed in the optical paths of the liquid crystal lenses for adjustment of optical paths and optimization of image quality.

Figure 2:
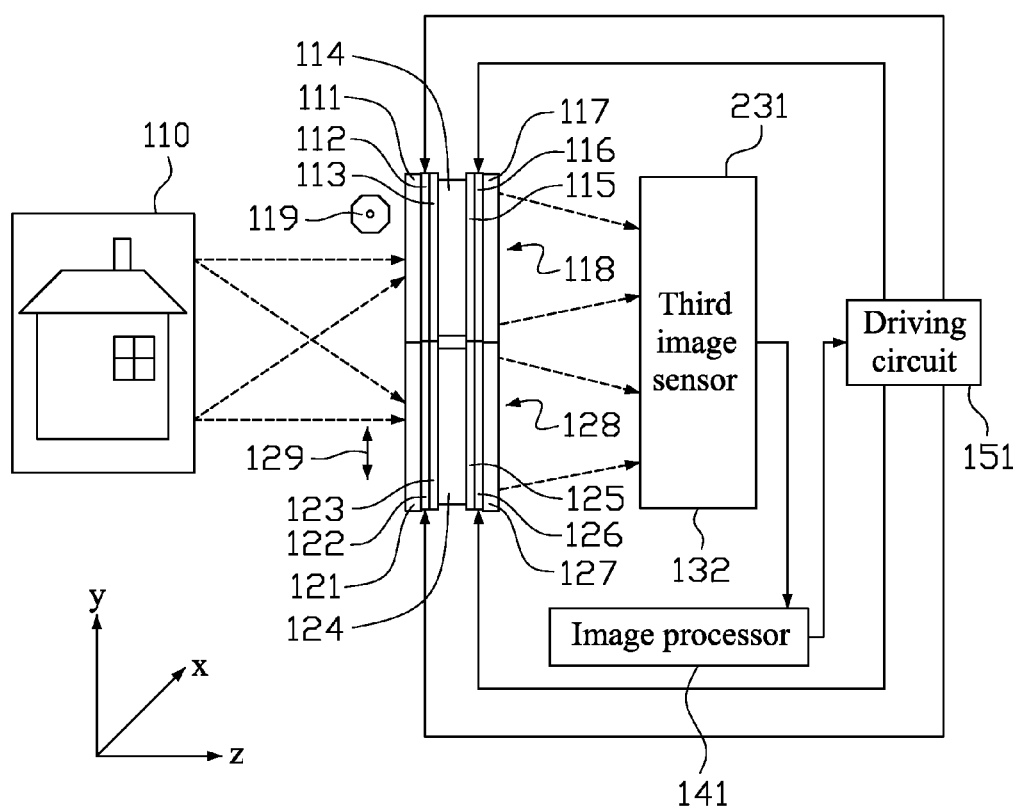
FIG. 2 is a schematic view of a liquid crystal lens imaging apparatus according to another exemplary embodiment of the present invention.

FIG. 2 illustrates a liquid crystal lens imaging apparatus according to another exemplary embodiment of the present invention. A difference of the liquid crystal lens imaging apparatus in FIG. 2 from the liquid crystal lens imaging apparatus in FIG. 1 is the number of image sensor. The liquid crystal lens imaging apparatus in FIG. 2 also can obtain high contrast image in the situation of without using polarizing device, and the thickness of the liquid crystal lens imaging apparatus can be decreased since the liquid crystal lenses are juxtaposed. In FIG. 1, each liquid crystal lens is corresponding to one image sensor, but in FIG. 2, two liquid crystal lenses are corresponding to one image sensor, i.e., the third image sensor 231 in FIG. 2. The third image sensor 231 are divided into two photosensitive areas, a first photosensitive area captures a light signal passing through the first liquid crystal lens 118, and a second photosensitive area captures a light signal passing through the second liquid crystal lens 128. The third image sensor 231 sends the light signals captured by the two photosensitive areas to the image processor 141 for processing. Since only using one image sensor to capture light signals passing through the two lens groups, not only the number of image sensor is reduced and the cost is down, but also the circuit structure is further simplified and the thickness of imaging apparatus is decreased.

It is indicated that, the image sensors in each of FIGS. 1 and 2 also can be referred to as an image capture unit. In the condition of each lens group including multiple liquid crystal lenses, rubbing directions of alignment layers of the multiple liquid crystal lenses in a same lens group are mutually parallel and are perpendicular to rubbing directions of alignment layers of the multiple liquid crystal lenses in neighboring another lens group.

Figure 3:
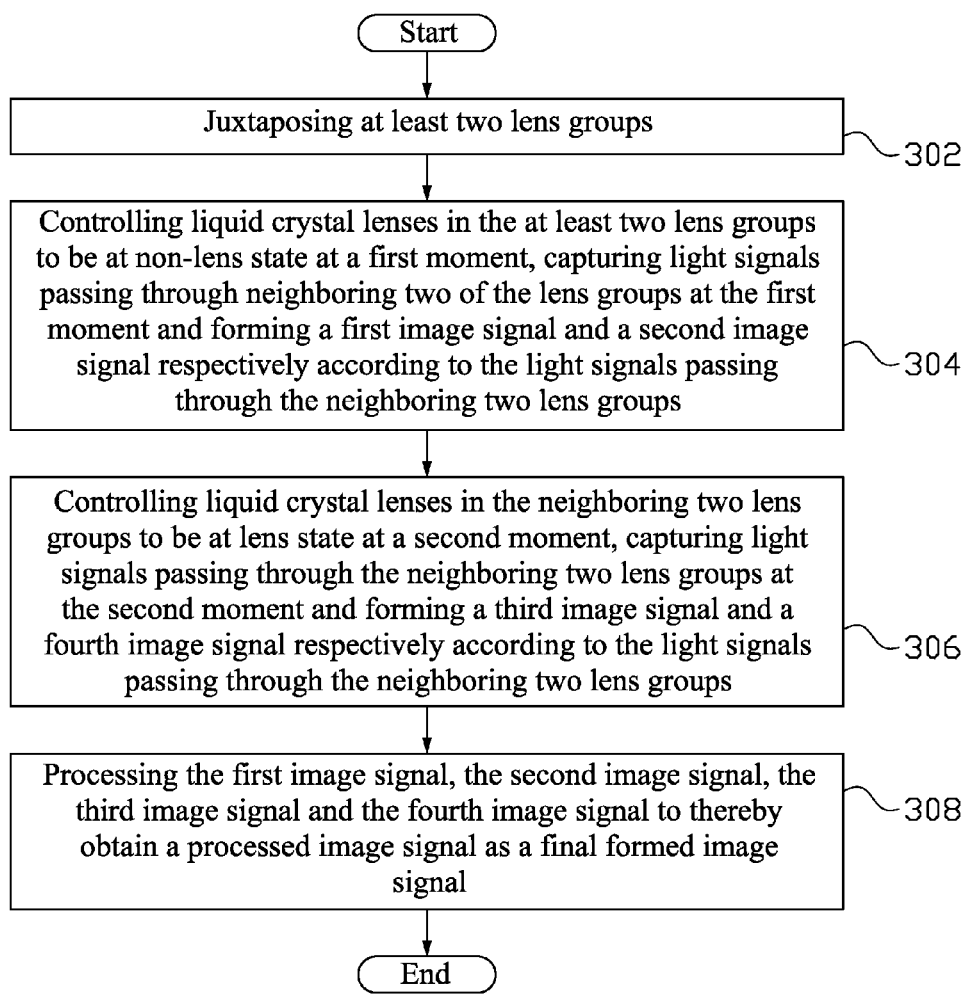
FIG. 3 is a flowchart of a liquid crystal lens imaging method according to an exemplary embodiment of the present invention.

FIG. 3 is a flowchart of a liquid crystal lens imaging method according to an exemplary embodiment of the present invention.

As shown in FIG. 3, the liquid crystal lens imaging method according to the exemplary embodiment of the present invention may include the following steps:

Step 302, juxtaposing at least two lens groups. Each lens group includes at least one liquid crystal lens. A rubbing direction of alignment layer of the liquid crystal lens in one lens group is perpendicular to a rubbing direction of alignment layer of the liquid crystal lens in neighboring another lens group.

Step 304, controlling liquid crystal lenses in the at least two lens groups to be at non-lens state at a first moment, capturing light signals passing through neighboring two of the lens groups at the first moment and forming a first image signal and a second image signal respectively according to the light signals passing through the two neighboring lens groups.

Step 306, controlling liquid crystal lenses in the two neighboring lens groups to be at lens state at a second moment, capturing light signals passing through the two neighboring lens groups at the second moment and forming a third image signal and a fourth image signal respectively according to the light signals passing through the two neighboring lens groups.

Step 308, processing the first image signal, the second image signal, the third image signal and the fourth image signal to thereby obtain a processed image signal as a final formed image signal.

In one aspect, the lens groups in the liquid crystal lens imaging apparatus are juxtaposed. Each lens group includes at least one liquid crystal lens or at least one liquid crystal micro-lens array. Compared with the related solution of stacked liquid crystal lenses, the liquid crystal lens imaging apparatus in the present embodiment since only has one layer of liquid crystal lenses and thus the thickness of the liquid crystal lens imaging apparatus is reduced. In another aspect, in order to obtain high quality image under the circumstance without using polarizer, in the above embodiment, a special control manner is adopted, i.e. at the first moment, the liquid crystal lenses are controlled to be at non-lens state so that the liquid crystal lenses at this moment do not converge or diverge the incident light and are like a glass; and at the second moment, the liquid crystal lenses are controlled to be at lens state so that the liquid crystal lenses at this moment are capable of converging or diverging the incident light. The images obtained at the two moments are processed to eliminate the influence of that without using polarizer as well as the influence of perspective difference between the two lens groups, and thereby high quality image can be obtained. Accordingly, the liquid crystal lens imaging apparatus according to the present invention under the circumstance without using polarizer not only can obtain high quality imaging but also can reduce the thickness of the liquid crystal lens imaging apparatus.

In the above technical solution, preferably, the processing of the first image signal, the second image signal, the third image signal and the fourth image signal includes superimposing the third image signal with processed fourth image signal and removing an image signal formed by the light signal without being modulated by the two lens groups from superimposed image signal to thereby obtain the final formed image signal. The image signal formed by the light signal without being modulated by the two lens groups is acknowledged according to the first image signal and/or the second image signal.

In the foregoing, it is explained that when the liquid crystal lenses are not applied with voltages, the liquid crystal lenses do not modulate the incident light; and when the liquid crystal lenses are applied with voltages, the liquid crystal lenses are capable of modulating the incident light. Since the rubbing directions of alignment layers of the liquid crystal lenses in the two lens groups are mutually perpendicular with each other, light components of the incident light affected by the two liquid crystal lenses are different. In order to obtain high quality image, it is necessary to eliminate the influence of stray light signal, the stray light signal herein is the light signal without being modulated by the liquid crystal lenses. At the second moment, the two liquid crystal lenses each only affect light on one polarization direction and the light signal on the other polarization direction is the stray light signal. The stray light signal can be acknowledged according to the light signals obtained at the first moment since the liquid crystal lenses at the first moment do not modulate the incident light, and thus the light signal useful for imaging can be filtered from the light signals obtained at the second moment based on the light signals obtained at the first moment.

In the above any one technical solution, preferably, the final formed image signal can be determined by the following formula:

$$III = I' + f(II') - [\beta I + (1-\beta)f(II)]$$

In the above formula, III is the final formed image signal, I' is the third image signal, II' is the fourth image signal, I is the first image signal, II is the second image signal, f(x) is a perspective mapping function for mapping an image formed based on a light signal passing through one lens group into an image formed based on a light signal passing through the other one lens group according to a perspective difference between the two lens groups. $\beta$ is a weighting factor, $\beta I + (1-\beta)f(II)$ represents the image signal formed by the light signal without being modulated by the two lens groups.

In order to remove unwanted image signal from the image signals obtained at the second moment, a corresponding processing algorithm is designed, and the processing algorithm is embedded in the image processor in the form of program. Since the liquid crystal lenses are juxtaposed, the two liquid crystal lenses have a perspective difference existed therebetween. In order to eliminate the influence of the perspective, a perspective mapping function is used in the algorithm to map one image into another image and thereby forming a hybrid image signal. As to the hybrid image signal corresponding to the second moment, since it contains unwanted image signal, and the unwanted image signal is determined by the two image signals corresponding to the first moment and the weighting factor $\beta$. When the weighting factor is 0, only the second image signal is used to eliminate the unwanted image signal; and when the weighting factor is 1, only the first image signal is used to eliminate the unwanted image signal.

In the above any one technical solution, preferably, a method for determining the weighting factor $\beta$ may include: determining the weighting factor $\beta$ according to parameters of the two lens groups and polarization difference of incident light for the two lens groups. The parameters of lens groups include focal length, aperture, and so on. The parameters of lens groups may change during shooting but are easy to be acknowledged. In another aspect, the polarization difference of incident light can be detected in real-time according to the image processing algorithm, and finally the weighting factor can be dynamically determined by combining the parameters of lens groups and the polarization difference.

In the above any one technical solution, preferably, the weighting factor $\beta$ is greater than or equal to 0 and smaller than or equal to 1.

In the above any one technical solution, preferably, when the incident light entering the two lens groups is natural light, the weighting factor $\beta$ is (½), and the quality of obtained final image at this situation is the best. When the incident light is natural light, light amplitudes in all directions are the same.

In the above any one technical solution, preferably, a time interval between the first moment and the second moment is controlled to be smaller than a preset time. In the preset time, the shooting scene does not have significant change (e.g., change factors such as change of light intensity, change of object displacement in the scene and moving of imaging apparatus). In order to ensure a difference between the incident light at the first moment and the incident light at the second moment to be very small, the time interval between the first moment and the second moment is as short as possible.

In the above any one technical solution, preferably, a distance between optical axes of two neighboring lens groups is controlled to be smaller than a preset value. The preset value is determined according to a minimum shooting distance of actual requirement. The smaller the minimum shooting distance is, the smaller the preset value can be set. For shooting a target object far away from the lens groups more, a fixed perspective mapping function can be used to eliminate the imaging difference caused by a tiny perspective difference.

In the above any one technical solution, preferably, the image sensors having a number matching with the number of the lens groups in one-to-one manner and are used to capture light signals passing through the liquid crystal lenses. Each image sensor is used to capture the light signal passing through the corresponding one lens group.

The liquid crystal lens imaging apparatus of the present invention has juxtaposed at least two lens groups. During the image processing, high contrast image can be obtained by processing image signals of the juxtaposed two lens groups. Accordingly, in a preferred embodiment, one lens group corresponds to one image sensor and thus two lens groups need two image sensors.

In the above any one technical solution, preferably, the image capture unit includes only one image sensor. The image sensor is divided into multiple photosensitive areas, the number of the photosensitive areas is matched with the number of the lens groups in one-to-one manner. Each the photosensitive area is used to capture a light signal passing through a corresponding one of the lens groups.

Since the cost of two sensors may be higher than that of one sensor, in order to reduce the device cost, a large-sized sensor can be used and each photosensitive area of the sensor is for capturing a light signal of a corresponding one lens group.

In the above any one technical solution, preferably, voltages inputted to the liquid crystal lenses in the two lens groups are adjusted according to an image characteristic of the final formed image signal.

In order to further obtain high contrast image, the image processor further can analyze the final formed image and then controls to adjust the voltages inputted to the liquid crystal lenses in the lens groups according to the analysis result, and thereby a better image can be obtained.

In the foregoing, several technical solutions according to the present invention are described in detail with reference to accompanying drawings, the present invention arranges two liquid crystal lenses with mutually perpendicular rubbing directions of alignment layers to be juxtaposed in one layer, incident light passes through the two lenses and then captured by the image sensor(s) behind the lenses, then a special image processing is performed and a final formed image is obtained. Accordingly, under the circumstance without using polarizer, a high quality image can be obtained and the received light intensity is increased, and furthermore, since the liquid crystal lenses are juxtaposed, the thickness of the liquid crystal lens imaging apparatus can be reduced consequently.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal lens imaging apparatus comprising:
   juxtaposed at least two lens groups, wherein each of the lens groups comprises at least a liquid crystal lens, a rubbing direction of alignment layer of the liquid crystal lens in one of the lens groups is perpendicular to a rubbing direction of alignment layer of the liquid crystal lens in neighboring another of the lens groups;
   a driving circuit, connected to the at least two lens groups and configured for controlling the liquid crystal lenses in the at least two lens groups to be at non-lens state at a first moment and controlling the liquid crystal lenses in the at least two lens groups to be at lens state at a second moment;
   an image capture unit, comprising at least one image sensor configured for capturing light signals passing through neighboring two of the lens groups at the first moment and forming a first image signal and a second image signal respectively according to the light signals passing through the two neighboring lens groups, and capturing light signals passing through the two neighboring lens groups at the second moment and forming a third image signal and a fourth image signal respectively according to the light signals passing through the two neighboring lens groups; and
   an image processor, connected to the image capture unit and configured for receiving the first image signal, the second image signal, the third image signal and the fourth image signal and processing the first image signal, the second image signal, the third image signal and the fourth image signal to thereby obtain a processed image signal as a final formed image signal.

2. The liquid crystal lens imaging apparatus as claimed in claim 1, wherein the image processor comprises:
   a calculating unit, configured for superimposing the third image signal with processed fourth image signal and removing an image signal formed by the light signal without being modulated by the two neighboring lens groups from superimposed image signal to thereby obtain the final formed image signal, wherein the image signal formed by the light signal without being modulated by the two neighboring lens groups is acknowledged according to the first image signal and/or the second image signal.

3. The liquid crystal lens imaging apparatus as claimed in claim 2, wherein the calculating unit determines the final formed image signal based on the following formula:

$$III = I' + f(II') - [\beta I + (1-\beta)f(II)]$$

wherein, III is the final formed image signal, I' is the third image signal, II' is the fourth image signal, I is the first image signal, II is the second image signal, f(x) is a perspective mapping function for mapping an image formed based on the light signal passing through one of the two neighboring lens groups into another image formed based on the light signal passing through the other one of the two neighboring lens groups according to a perspective difference between the two neighboring lens groups, $\beta$ is a weighting factor, $[\beta I + (1-\beta)f(II)]$ represents the image signal formed by the light signal without being modulated by the two neighboring lens groups.

4. The liquid crystal lens imaging apparatus as claimed in claim 3, wherein the image processor further comprises:
   a weighting factor determining unit, configured for determining the weighting factor $\beta$ according to parameters of the lens groups and a polarization difference of incident light for the lens groups.

5. The liquid crystal lens imaging apparatus as claimed in claim 3, wherein the weighting factor is greater than or equal to 0 and smaller than or equal to 1.

6. The liquid crystal lens imaging apparatus as claimed in claim 3, wherein an incident light entering the lens groups is natural light, the weighting factor $\beta$ is ½.

7. The liquid crystal lens imaging apparatus as claimed in claim 1, wherein a time interval between the first moment and the second moment is smaller than a preset time.

8. The liquid crystal lens imaging apparatus as claimed in claim 1, wherein a distance between optical axes of the two neighboring lens groups is smaller than a preset value.

9. The liquid crystal lens imaging apparatus as claimed in claim 1, wherein the image capture unit comprises image sensors having a number matching the number of the lens groups with one-to-one relationship, each of the image sensors is configured for capturing the light signal passing through a corresponding one of the lens groups.

10. The liquid crystal lens imaging apparatus as claimed in claim 1, wherein the image capture unit comprises one image sensor, the image sensor is divided into a plurality of photosensitive areas, the photosensitive areas have a number matching the number of the lens groups with one-to-one relationship, each of the photosensitive areas is configured for capturing the light signal passing through a corresponding one of the lens groups.

11. The liquid crystal lens imaging apparatus as claimed in claim 1, wherein the image processor is connected to the driving circuit and configured for issuing a control signal to the driving circuit according to an image characteristic of the final formed image signal; the driving circuit is configured for adjusting voltages inputted to the liquid crystal lenses in the lens groups according to the control signal.

12. A liquid crystal lens imaging method comprising:
    juxtaposing at least two lens groups, wherein each of the lens groups comprises at least a liquid crystal lens, a rubbing direction of alignment layer of the liquid crystal lens in one of the lens groups is perpendicular to a rubbing direction of alignment layer of the liquid crystal lens in neighboring another of the lens groups;
    controlling the liquid crystal lenses in the at least two lens groups to be at non-lens state at a first moment, capturing light signals passing through neighboring two of the lens groups at the first moment and forming a first image signal and a second image signal respectively according to the light signals passing through the two neighboring lens groups;
    controlling the liquid crystal lenses in the two neighboring lens groups to be at lens state at a second moment, capturing light signals passing through the two neighboring lens groups at the second moment and forming a third image signal and a fourth image signal according to the light signals passing through the two neighboring lens groups; and
    processing the first image signal, the second image signal, the third image signal and the fourth image signal to thereby obtain a processed image signal as a final formed image signal.

13. The liquid crystal lens imaging method as claimed in claim 12, wherein the step of processing the first image signal, the second image signal, the third image signal and the fourth image signal comprises:
    superimposing the third image signal with processed fourth image signal and removing an image signal formed by the light signal without being modulated by the two neighboring lens groups from superimposed image signal to thereby obtain the final formed image signal, wherein the image signal formed by the light signal without being modulated by the two neighboring lens groups is acknowledged according to the first image signal and/or the second image signal.

14. The liquid crystal lens imaging method as claimed in claim 13, wherein the final formed image signal is determined based on the following formula:

$$III = I' + f(II') - [\beta I + (1-\beta) f(II)]$$

wherein, III is the final formed image signal, I' is the third image signal, II' is the fourth image signal, I is the first image signal, II is the second image signal, f(x) is a perspective mapping function for mapping an image formed based on the light signal passing through one of the two neighboring lens groups into another image formed based on the light signal passing through the other one of the two neighboring lens groups according to a perspective difference between the two neighboring lens groups, $\beta$ is a weighting factor, $[\beta I + (1-\beta) f(II)]$ represents the image signal formed by the light signal without being modulated by the two neighboring lens groups.

15. The liquid crystal lens imaging method as claimed in claim 14, wherein the step of processing the first image signal, the second image signal, the third image signal and the fourth image signal comprises:
    determining the weighting factor $\beta$ according to parameters of the lens groups and a polarization difference of incident light for the lens groups.

16. The liquid crystal lens imaging method as claimed in claim 14, wherein the weighting factor is greater than or equal to 0 and smaller than or equal to 1.

17. The liquid crystal lens imaging method as claimed in claim 14, wherein an incident light entering the lens groups is natural light, the weighting factor $\beta$ is ½.

18. The liquid crystal lens imaging method as claimed in claim 12, wherein a time interval between the first moment and the second moment is smaller than a preset time.

19. The liquid crystal lens imaging method as claimed in claim 12, wherein a distance between optical axes of the two neighboring lens groups is smaller than a preset value.

20. The liquid crystal lens imaging method as claimed in claim 12, further comprising:
    adjusting voltages inputted to the liquid crystal lenses in the two neighboring lens groups according to an image characteristic of the final formed image signal.

* * * * *